(No Model.)
G. C. HAAG.
LOADING ATTACHMENT FOR CARTS.
No. 492,763.　　　　　　　　　Patented Feb. 28, 1893.
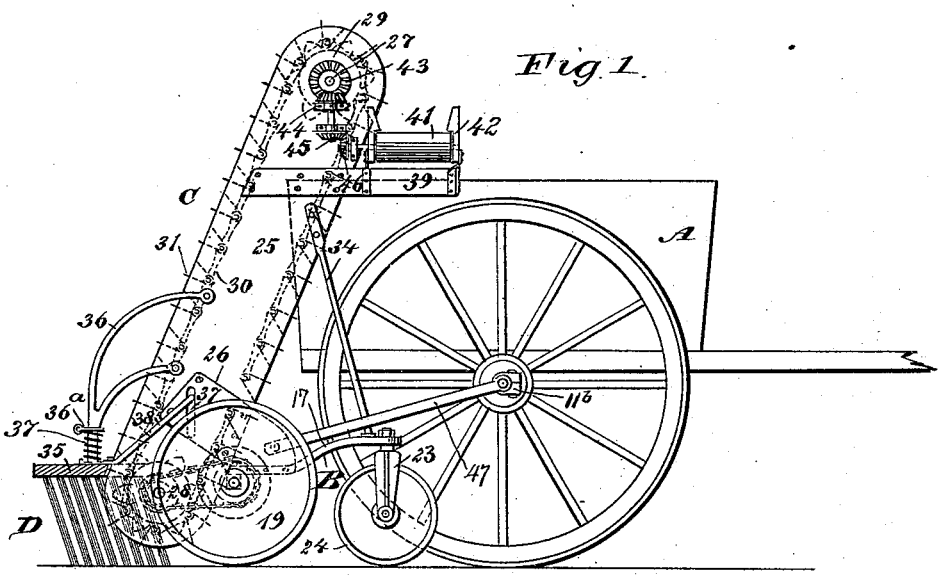
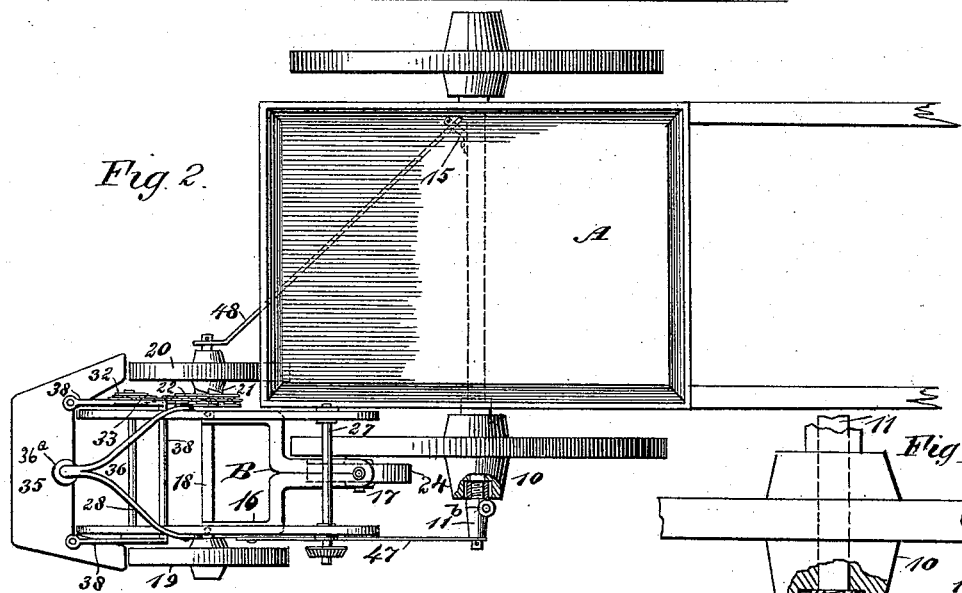
WITNESSES:　　　　　　　　　　　INVENTOR
Paul Johst　　　　　　　　　　　G. C. Haag
C. Sedgwick　　　　　　　　BY Munn & Co.
　　　　　　　　　　　　　　　　ATTORNEYS.

UNITED STATES PATENT OFFICE.

GUSTAV CH. HAAG, OF NEW YORK, N. Y.

LOADING ATTACHMENT FOR CARTS.

SPECIFICATION forming part of Letters Patent No. 492,763, dated February 28, 1893.

Application filed August 25, 1892. Serial No. 444,062. (No model.)

*To all whom it may concern:*

Be it known that I, GUSTAV CH. HAAG, of New York city, in the county and State of New York, have invented a new and Improved Loading Attachment for Dump-Carts, of which the following is a full, clear, and exact description.

My invention relates to an improvement in loading attachments for dump carts, and has for its object to provide an attachment capable of being applied to any cart, and which may be readily detached from the cart when the attachment is not required for use, and further to provide a loading attachment which is complete in itself and which depends upon the cart only for a support, and further to so construct the attachment that it will be simple, durable and economic, and capable of being readily attached to or removed from the cart and operated entirely independent of said cart.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of a cart and the attachment, one being attached to the other. Fig. 2 is a plan view of the cart and the attachment, the conveyer of the attachment being removed, likewise the elevating buckets and carrying chain. Fig. 3 is a section taken through the cart body and illustrating the elevator of the attachment in rear elevation and also showing the connection between the elevator and the conveyer; and Fig. 4 is a detail view of the hub of one of the wheels of the cart, and the device employed for connecting the attachment with the axle upon which the hub revolves.

As has heretofore been stated the cart A, may be an ordinary dump cart. Instead of a nut, however, for use to hold one of the wheels 10 upon the axle 11, the nut is substituted by a cap 11$^b$, preferably of solid construction, the said cap consisting of a body portion 11$^a$, made ordinarily in two sections having a hinged connection, and a socket 12, formed at the lower end of the body, interiorly threaded to be screwed upon the outer threaded surface of the axle, the socket occupying the same position upon the hub of the wheel and upon the axle as the ordinary lock nut, while the body 11$^a$ of the cap extends outward some distance beyond the end of the axle, and the forward end of the body is provided with a horizontal integral post 13, apertured to receive a cotter pin 14, or like device.

The axle of the cart near the end opposite to that carrying the cap, is provided with a bracket 15, attached thereto, shown in dotted lines in Fig. 2. With these two exceptions the cart need not depart from the ordinary pattern.

With reference to the attachment it consists of a body frame B. This frame is essentially horizontally located, and comprises an essentially rectangular body 16, of skeleton pattern, and a shank 17, projected forwardly and centrally from the body. The shank is shown in Fig. 1, as usually curved upward slightly from the body. In the rear extremity of the body an axle 18, is secured, and this axle outside of the body frame carries at each end a supporting wheel, the outer wheel being designated as 19 and the inner one as 20. The inner wheel is provided with a clutch face 21 upon the inner surface of its hub, and both wheels 19 and 20, turn loosely upon the axle. The clutch face 21 of the wheel 20, is adapted for engagement with a corresponding face formed upon a sprocket wheel 22, loosely mounted on the axle 18, and this sprocket wheel is not revolved unless the hub of the driving wheel 20, is in locking engagement with it.

In the forward extremity of the shank member of the frame a hanger 23, is located, and in this hanger a small forward supporting wheel 24, is journaled. The frame B, is adapted to support an elevator C. This elevator consists of side framings 25, which side framings are secured to the frame by means of plates 26, which plates are attached to the outer faces of the sides near their bottom portions, and likewise to the outer edges of the frame.

A shaft 27, is journaled in the upper end of the side framings of the elevator, and a second shaft 28, is journaled near the lower end. These shafts carry drums 29, shown in dotted lines in Fig. 1, and over the drums endless chain belts 30, are passed, the chain belts carrying a series of buckets 31. The drums at their ends are toothed, as is likewise shown in Fig. 1, which teeth pass through the links of the chain belts. The endless chain belts are rotated by giving movement to the lower shaft 28, and this is accomplished by attaching to the inner extremity of the said shaft a sprocket wheel 32, which is connected by a chain belt 33, with the sprocket wheel 22 loosely mounted upon the axle 18. Thus when the driving wheel 20 is in locking engagement with the sprocket wheel 22, motion is communicated to the lower elevator shaft 28 by the chain belt 33.

The elevator stands in somewhat of an inclined position, inclining in direction of the front of the attachment at its upper end, and it is supported in this position, in addition to the plates 26, by rods 34, secured to the sidings near the upper ends of the latter and to the shank of the frame B. Immediately back of the lower end of the elevator the broom or brush D, is located, the head 35 of which brush or broom is somewhat U-shaped, so that it extends not only across the back of the elevator but likewise past its sides, as shown in the plan view, Fig. 2, and the bristles, or sweeping agents of the brush, are made to conform in exterior contour to that of the head. The brush head is supported by means of arms 36, which are secured at their upper ends to the sides of the elevator, their lower ends being carried through the head of the broom or brush and loosely fitted therein, their inner extremities being enlarged so as not to leave the brush head. A spring 37, is wound around each arm, the upper end of the spring being held stationary against a collar 36$^a$ on the arm, while the lower end of each of the springs has bearing against the head, so that if the broom or brush meet with any obstruction it may be forced upward against the tension of the springs, and when the obstruction is passed the broom or brush will be automatically forced to the ground. The broom or brush has likewise guided movement in the elevator, which is effected by producing diagonal slots 37 in the sides of the elevator and in the plates 26, and passing through these slots the bow section of a yoke-shaped rod 38, the members of which rod at their extremities, are attached to the brush head, as shown in Fig. 2.

Horizontal brackets 39, are projected from each side of the elevator, the brackets being so located that when the attachment is applied to a cart they will be practically on a level with the upper edge of the said cart. These brackets are adapted to carry at their ends rollers 40, and these rollers carry an endless conveyer belt 41, the belt running horizontally and at right angles to the line of travel of the elevator buckets, and receives the material delivered by the buckets and delivers that material into the body of the cart. At each end of the rollers side boards 42, are projected upward from the brackets, so that the material delivered to the conveyer belt will not be spilled therefrom. The conveyer belt is driven from the upper shaft of the elevator, said upper shaft being provided at one of its ends with a beveled gear 43, which meshes with a similar gear 44, attached to the upper end of a short shaft journaled upon the side of the elevator, and this shaft carries at its lower end a second beveled gear 45, which meshes with a beveled pinion 46, secured to the trunnions of one of the rollers over which the conveyer belt passes.

The attachment of the device to the cart is effected by securing to the outer plate 26 a connecting rod 47, and this rod is passed over the rod 13 upon the axle cap 11$^b$, and is held in engagement with the cap by the cotter pin 14, above referred to. A second connecting rod 48, is attached to the inner end of the axle of the attachment, and likewise to the bracket 15 of the axle of the cart. It will thus be seen that in operation as the cart is moved forward, when the clutch face of the driving wheel 20, is in engagement with that of the sprocket wheel 22, the elevator buckets will be set in motion, will receive the sweepings from the broom, carry them upward and deliver them to the conveyer belt 41, from whence they will be delivered into the cart body. When the cart is full the attachment may be removed from the cart by disengaging the connecting rods 48 and 47 from the axle of the cart, and the outer section of the cap 11$^b$, is folded backward, as shown in dotted lines, Fig. 4, so that it will be out of the way.

It is evident that this attachment is not only simple and durable but that it is also economic in its construction and may be applied readily to any vehicle such as a cart.

Having thus described my invention, I claim as new and desire to secure by Letters Patent—

1. A loading attachment for carts, the same consisting of a frame supported by wheels, an elevator held in an upright position by the frame, a conveyer located near the upper end of the elevator and standing at an angle thereto, a driving connection between the conveyer and the elevator, a driving connection between one of the supporting wheels of the frame and the elevator, and a brush located near the bottom of the elevator, the said brush being U-shaped and spring-controlled and capable of limited vertical movement, substantially as shown and described.

2. In a loading attachment for carts and like vehicles, the combination, with the axle of the vehicle, and a cap adapted to be screwed upon one outer end of the axle, of a loading attachment adapted for removable attachment to a cart, the same consisting of a body frame, wheels supporting the same, an elevator held in an upright position by the frame, a conveyer supported by the elevator transversely thereof and adapted to extend over the cart body, a driving connection between the elevator and the conveyer, a driving connection between the conveyer and the supporting wheels of the device, a spring-controlled brush located back of the elevator and supported thereby, said brush being capable of limited vertical movement, and connecting rods, one uniting the supporting frame of the device with the axle of the vehicle, and the other connecting the frame with the cap upon the axle, substantially as and for the purpose set forth.

GUSTAV CH. HAAG.

Witnesses:
PETER F. HILLENBRAND,
HENRY JAEGER.